(12) United States Patent
Bas Gago et al.

(10) Patent No.: US 9,649,935 B2
(45) Date of Patent: May 16, 2017

(54) METHOD AND ON-BOARD SYSTEM FOR VIEWING WEATHER HAZARDS

(71) Applicant: GTD Sistemas de Informacion, Barcelona (ES)

(72) Inventors: Isidro Bas Gago, Ripollet (ES); Oscar Dominguez Armesto, Sant Quirze del Valles (ES)

(73) Assignee: GTD SISTEMAS DE INFORMACION, Barcelona (ES)

( * ) Notice: Subject to any disclaimer, the term of this patent is extended or adjusted under 35 U.S.C. 154(b) by 5 days.

(21) Appl. No.: 14/736,544

(22) Filed: Jun. 11, 2015

(65) Prior Publication Data
US 2015/0360566 A1 Dec. 17, 2015

(30) Foreign Application Priority Data
Jun. 12, 2014 (FR) ..................... 14 55336

(51) Int. Cl.
| | |
|---|---|
| *G01C 21/00* | (2006.01) |
| *G01C 23/00* | (2006.01) |
| *B60K 35/00* | (2006.01) |
| *G08G 5/00* | (2006.01) |
| *G01S 7/24* | (2006.01) |
| *G01W 1/10* | (2006.01) |
| *G01S 13/95* | (2006.01) |

(52) U.S. Cl.
CPC .............. *B60K 35/00* (2013.01); *G01C 21/00* (2013.01); *G01C 23/00* (2013.01); *G01S 7/24* (2013.01); *G01W 1/10* (2013.01); *G08G 5/0047* (2013.01); *G01S 13/95* (2013.01); *G01W 2203/00* (2013.01); *G08G 5/0091* (2013.01)

(58) Field of Classification Search
CPC combination set(s) only.
See application file for complete search history.

(56) References Cited

U.S. PATENT DOCUMENTS

| | | | |
|---|---|---|---|
| 6,577,947 B1 | 6/2003 | Kronfeld | |
| 6,744,382 B1 | 6/2004 | Lapis | |
| 7,109,913 B1 | 9/2006 | Paramore | |
| 8,106,794 B2 | 1/2012 | Pinheiro | |

(Continued)

FOREIGN PATENT DOCUMENTS

| | | |
|---|---|---|
| FR | 2 923 008 A1 | 5/2009 |
| WO | 2013/130897 A1 | 9/2013 |

OTHER PUBLICATIONS

Todd A. Stephenson, "An Introduction to Bayesian Network Theory and Usage" IDIAP Research Report, Feb. 2000.

(Continued)

*Primary Examiner* — Travis Hunnings
(74) *Attorney, Agent, or Firm* — Pearne & Gordon, LLP

(57) ABSTRACT

A method and a system for viewing weather hazards which is on-board an aircraft. The system (300) includes communication means (330) for receiving weather information relating to a given region, a processor (310) for determining, at each point of the region, the future instant at which the vehicle would reach this point, an expert system (340) for estimating, at each point of the region, from the weather information and the future instant, the weather hazard at that point, and a graphic interface (360) for displaying, at each point of the region, the weather hazards thus estimated by the expert system.

10 Claims, 10 Drawing Sheets

(56) References Cited

U.S. PATENT DOCUMENTS

| | | | |
|---|---|---|---|
| 9,349,296 B2 * | 5/2016 | Wiesemann | G01C 23/00 |
| 2004/0044445 A1 | 3/2004 | Burdon | |
| 2011/0001662 A1 * | 1/2011 | Fouet | G01S 7/003 |
| | | | 342/26 B |
| 2012/0155704 A1 * | 6/2012 | Williams | G01W 1/00 |
| | | | 382/103 |
| 2012/0232785 A1 * | 9/2012 | Wiesemann | G01C 23/00 |
| | | | 701/423 |

OTHER PUBLICATIONS

Search Report issued in French Patent Application No. FR 14 55336 dated Feb. 10, 2015.

\* cited by examiner forecast situation for t=t₁

$d, \delta, \tau$ nowcast situation in t=t₁

METHOD AND ON-BOARD SYSTEM FOR VIEWING WEATHER HAZARDS

TECHNICAL FIELD

The present invention generally relates to the field of weather monitoring and more particularly to that of viewing weather hazards on-board a vehicle such as an aircraft.

STATE OF PRIOR ART

Weather conditions can dramatically affect the safety of an aircraft during its flight phase or its take-off and approach phases. In particular, storm events often associated with atmospheric turbulences and to strong rain or hail precipitations, can impose changes of flight route. These changes result in an increased work load for the aircraft controllers and pilots. Hence, the available air space is reduced, which imposes to leave some flights on hold. As a result, there are frequent delays, additional operating costs (consumed amount of fuel) and a general degradation in the quality of service. Further, the aircraft flight routes are sometimes uselessly changed insofar as the bad weather conditions would have disappeared or would have move away if the aircraft had kept its initial path.

In an aircraft, monitoring weather hazards is generally performed using a weather radar on-board the nose. It conventionally uses a movable antenna along two axes so as to be able to mechanically scan the radar beam over a wide azimuth angular range and for discrete elevation angular values. These weather radars enable weather conditions to be represented in real time ahead of the aircraft in an angular sector of about 160° and with a range in the order of 320 NM (nautical miles). When the weather hazard is at a short distance (for example less than 120 NM), the pilot has only little time to anticipate it and begin an evasive manoeuvre. It is therefore necessary to be able to anticipate these evasive manoeuvres as soon as possible.

In U.S. Pat. No. 7,109,913, it has been suggested to merge weather information obtained by radar reflectometry with pressure and temperature measurements taken on-board the aircraft as well as satellite weather information forwarded by ground stations. Although this system enables an instantaneous appreciation of weather hazards to be improved in a given region, it does not however enable the evolution of these hazards to be readily anticipated for the aircraft.

On the other hand, as a general rule before leaving, the pilot has weather broadcasts in the form of weather maps. Subsequently, he/she can receive alerts on the evolution of the weather conditions by means of messages transmitted from the ground, in particular by the Airline Operational Control (AOC) or the Air Traffic Control (ATC) control centres. These messages however only give inaccurate information about the location, the extent and the evolution of the hazards. The pilot is frequently obliged to follow an alternative flight route to that initially foreseen without having an accurate overview of the weather hazards to which the aircraft is actually exposed. International application WO-A-2013/130897 describes a method of rationalizing exchanges of weather information between pilots, air traffic controllers and airlines to represent turbulence hazards more accurately. However, this method does not enable the pilot to appreciate and anticipate hazards along his/her path, as shown in FIGS. 1A-1B and 2A-2B.

FIGS. 1A and 1B represent a first example of weather conditions in a given region ahead of the aircraft, respectively at a first given time, $t_0$, and a second given time, $t_1$, after $t_0$. Cb refers to a stormy development (cumulonimbus) developing in this region. It is noticed that it has moved between the instants $t_0$ and $t_1$, such that if it did not present a hazard for the aircraft A moving along its flight route R at the instant $t_0$, it represents a real hazard at the instant $t_1$.

FIGS. 2A and 2B represent a second example of weather conditions in the region in question, with the same notation conventions as previously.

In this example, the pilot has changed his/her flight route I into I' because of the presence of the hazard created by Cb on its flight route, identified at the instant $t_0$. However, it is observed that this evasive manoeuvre is useless since at the instant $t_1$, the hazard created by Cb does no longer threaten the initially chosen path.

Consequently, the purpose of the present invention is to provide a method and an on-board system for viewing weather hazards which enable the pilot to clearly and reliably anticipate and estimate the evolution of these hazards, and in the case where it proves to be necessary, to change his/her flight route early enough not to encounter the hazard in question.

DISCLOSURE OF THE INVENTION

The present invention relates to a system and a method for viewing weather hazards as defined in the independent claims hereinafter. Advantageous embodiments are given in the dependent claims.

BRIEF DESCRIPTION OF THE DRAWINGS

Further characteristics and advantages of the invention will appear upon reading a preferential embodiment of the invention described with reference to the appended figures among which.

DETAILED DISCLOSURE OF PARTICULAR EMBODIMENTS

In the following disclosure, a system for viewing weather hazards which is on-board an aircraft will be considered. However, those skilled in the art will understand that the invention is likely to be also applied to other types of vehicle such as a vessel for example. This system for viewing weather hazards can be advantageously used as a navigation aid system insofar as the vehicle pilot can change his/her flight route so as to avoid the hazard in question.

Figure 1A:
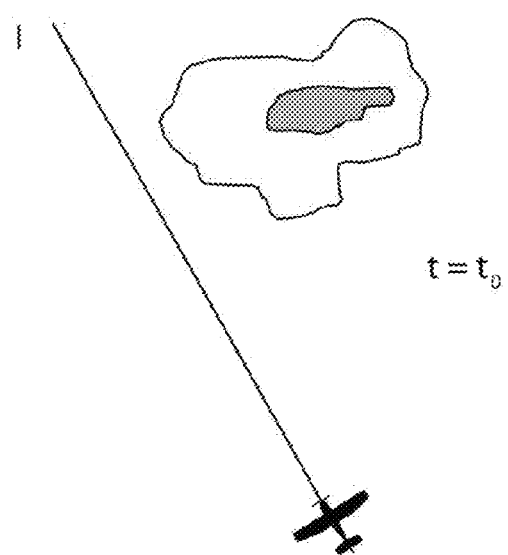
FIGS. 1A and 1B represent a first example of weather conditions in a given region, respectively at a first instant and a second instant.
Figure 1B:
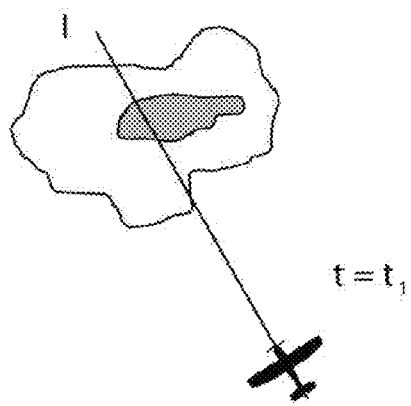
Figure 2A:
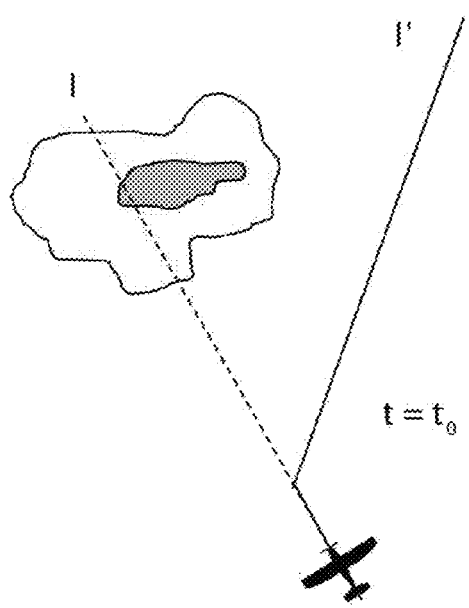
FIGS. 2A and 2B represent a second example of weather conditions in a given region, respectively at a first instant and a second instant.
Figure 2B:
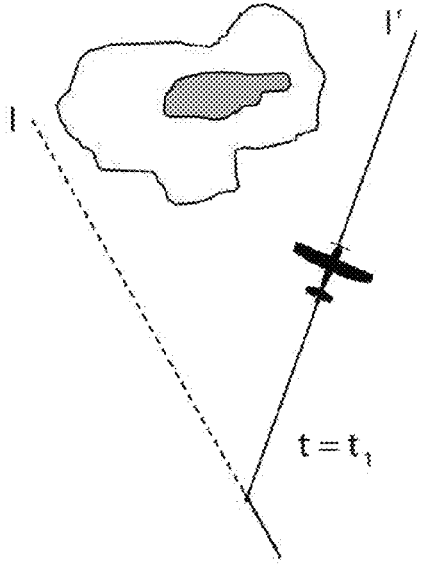
Figure 3:
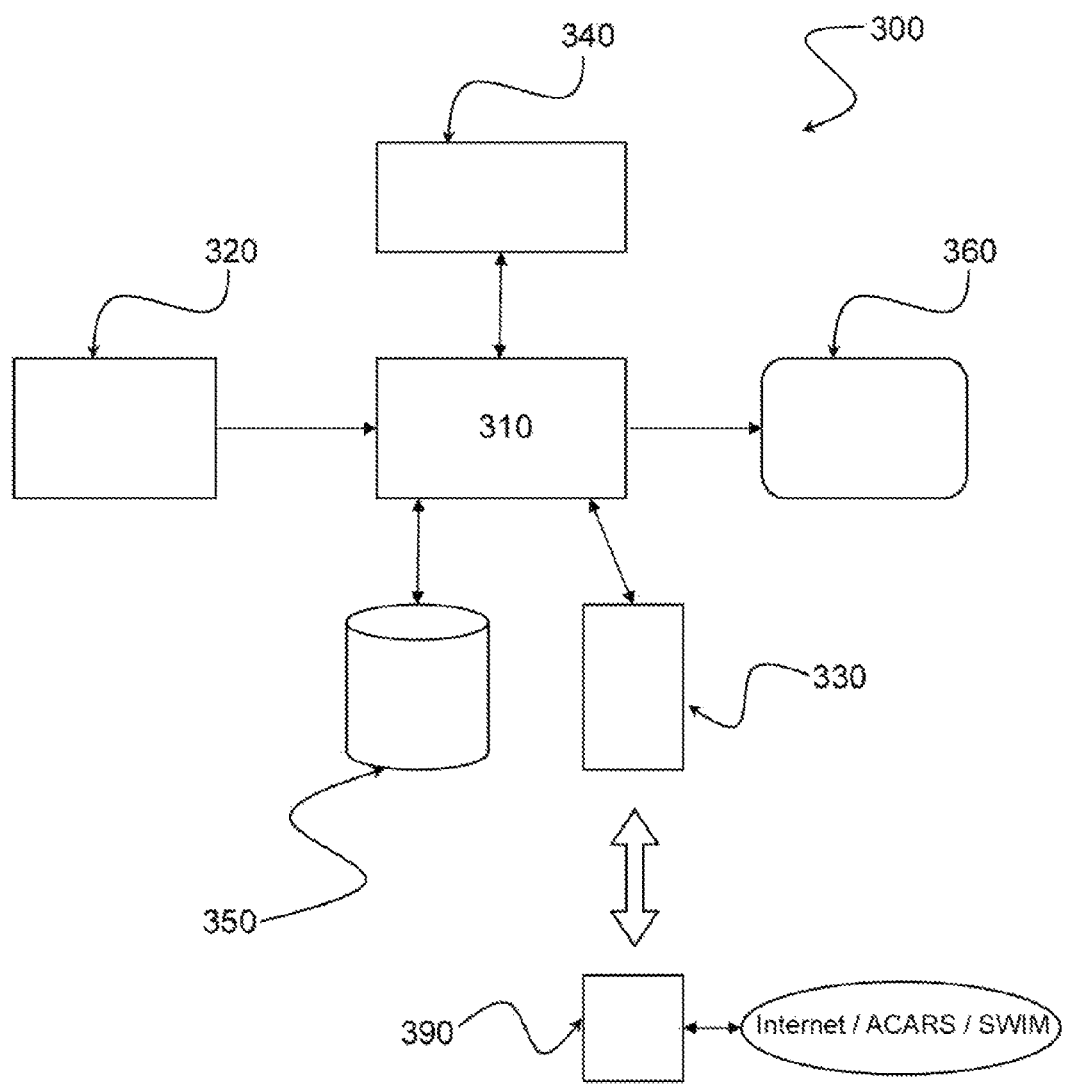
FIG. 3 schematically represents a system for viewing weather hazards according to an embodiment of the invention.

FIG. 3 represent an on-board system for viewing weather hazards, 300.

This system comprises a processor, 310, coupled with a navigation system, 320, communication means 330, an expert system, 340, as well as a mass storage 350 and a graphic user interface (GUI), 360.

The navigation system, 320, is adapted to provide at each instant to the processor, 310, the current position of the aircraft as well as its main navigation parameters, in particular its speed, its direction and optionally, its flight route, given for example by means of waypoints.

The communication means, 330, enable weather information to be received via the uplink. This weather information is for example collected and transmitted by a ground station, 390, connected to the ACARS communication network, to the Internet network or to the SWIM (System Wide Information Management) network developed within the SESAR (Single European Sky ATM Research) European scope and within the NextGen (Next Generation Air Transportation System) US scope. The weather information can be provided by the weather data providers, in turn processing data transmitted by the weather observation ground stations or weather satellites (for example METEOSAT satellites). As it knows the aircraft position, the processor 310 can selectively download via the uplink the weather information in a region of interest. This information can be relating to nowcast or forecast weather conditions. By weather conditions, it is meant in particular the presence of storms, turbulence, frosting, or even volcanic ashes, convection or wind events, wind speeds, degree of precipitation, precipitation types (rain, hail), height and thickness of cloud layers, types of clouds (in particular cumulonimbus), this list being of course not exhaustive in any way. The weather conditions can be capable of creating weather hazards for the aircraft. A weather hazard will refer to a hazard to which the aircraft (or its passengers) is exposed because of the presence of weather conditions at a given place. Indeed, it is understood that only some weather conditions at the place or in the proximity of the place where the aircraft is are capable to expose it to a hazard justifying an evasive manoeuvre.

Nowcast and/or forecast weather information in a given region is stored by the processor in the mass storage 350. The weather information is indexed by the spatial coordinates (preferably in three dimensions) and a time variable. In other words, the mass storage contains a spatio-temporal weather database. For a given type of weather condition, when more recent nowcast or forecast data are available, they overwrite oldest data.

The estimation of the weather hazards for the aircraft is performed by the expert system from, on the one hand, the weather information, stored in the mass storage and, on the other hand, the position and navigation parameters of the aircraft (in particular its speed, its direction and, if need be, its flight route), provided by the processor 310.

The expert system, 340, estimates at each point of the predetermined region or the region selected by the pilot, the weather hazard level to which the aircraft is exposed. More precisely, the processor 310 determines for each given point of this region, the future instant at which the point could be reached in view of the current position and the navigation parameters of the aircraft. The expert system then estimates the weather hazard to which the aircraft would be exposed if it were at this point at said future instant. It is essential to notice that the hazard estimated is not the one to which the aircraft would be exposed if it were at the considered point at the present instant but the one to which the aircraft would be exposed at that point at the moment when it would reach it. Thus, the estimation of the hazard takes into account the evolution of the weather conditions during the travel time of the aircraft. The estimation of the weather hazard is made using a probabilistic model as described later.

Figure 4A:
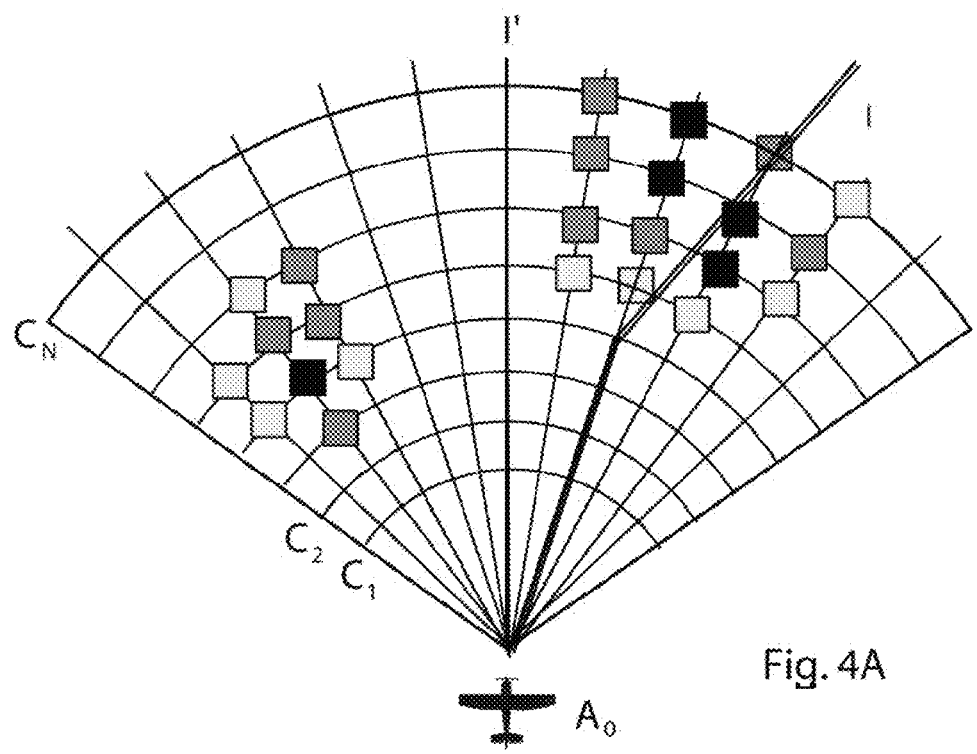
FIGS. 4A and 4B represent two examples of regions for viewing weather hazards for the system of FIG. 3.
Figure 4B:
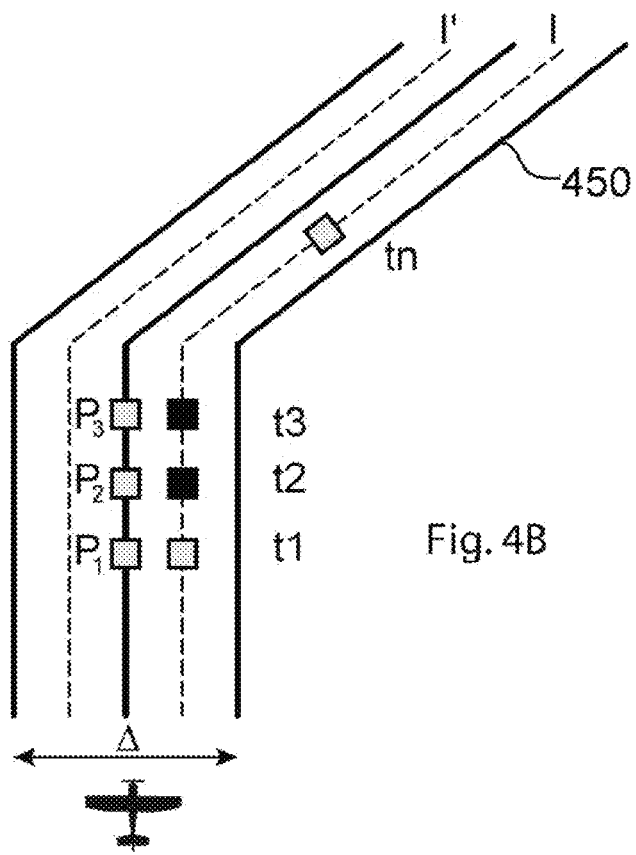

FIGS. 4A and 4B represent an estimation of weather hazards for two examples of regions, ahead of an aircraft.

In the case of FIG. 4A, the estimation of the weather hazards is performed for the entire sector the vertex of which is substantially centred on the aircraft position, without the hypothesis of a particular path. The sector is assumed to be located in the horizontal plane of the aircraft. Alternatively, another altitude could be considered, by means of considering the time necessary for an altitude change (which would be the case in particular in the case of a vertical evasive attempt). The sector is generally located in the half-plane ahead of the aircraft (angular range lower than 180°). However, a sector with a higher angular range may be envisaged.

In FIG. 4A, the aircraft stands at a current position, noted $A_0$, at a current instant $t_0$. In view of its speed V, the aircraft can reach the concentric circles $C_1, C_2, \ldots, C_N$ at the instants $t_1, t_2, \ldots, t_N$. Of course, the different points of a same circle can be reached by means of a heading change of the aircraft. It has been simply considered herein that the time necessary for the heading change was negligible with respect to $\delta t = t_1 - t_0$. Generally, it will be understood that the points the aircraft can reach after a time interval $\delta t$ are located on a sheet in the three-dimensional space, this sheet being not necessarily spherical because of the times required for the heading and altitude changes. The expert system will advantageously go from sheet to sheet, so as to sequentially process all the points corresponding to a same time offset $\delta t$. Thus, in the case of FIG. 4A, the points of the sector-specific region are processed according to successive concentric circles. For a circle $C_n$, the expert system extracts from the mass storage the forecast weather conditions for the corresponding time $t_n$ and estimates the weather hazard at each of the points of this circle. Alternatively, the expert system extracts from the mass storage the current (nowcast or forecast) weather conditions and a forecast for their evolution to evaluate the hazard at each point of the circle.

The hazard can be represented according to a grey level intensity scale or a colour scale. In the case of FIG. 4A, the maximum hazard is represented in the form of grey levels. In the present case, it can be seen that the aircraft has to change its flight route I so as not to be exposed to a maximum weather hazard. It can for example choose the flight route I' to avoid the hazard in question.

In the case of FIG. 4B, the estimation of weather hazards is performed for a predetermined flight route I of the aircraft or for a relatively narrow corridor, with a width Δ on either side of this path. The corridor width can be chosen by the pilot, for example by making a selection from a set of predetermined widths or simply by moving the edges of the corridor, 450, using the pointer of a mouse. Anyway, the processor then determines the instants $t_1, \ldots, t_N$ at which the aircraft would respectively reach the points $P_1, \ldots, P_N$ of the path I, in view of its flight plan. As previously, the expert system extracts from the mass storage the forecast weather conditions for the times $t_1, \ldots, t_N$ and deduces therefrom the weather hazard at the points considered. Alternatively, it could extract from the mass storage the current weather conditions at the points considered and a forecast of their evolution. In the illustrated case, the path I' represents a good alternative to avoid the hazards.

The advantage of this alternative is to require fewer calculations and enables a path to be simply validated. If a weather hazard is present in this path, the pilot can opt for the first alternative and then obtain a mapping of the hazards on the entire desired region. Conversely, after choosing a flight route using the first alternative, the pilot can then just view the hazards along the chosen flight route.

The expert system estimates a weather hazard level from the current position of the aircraft, a possible position thereof at a future instant in the considered region and the forecast weather conditions for this instant. To do this, the expert system advantageously uses a probabilistic model of the weather hazard. This probabilistic model is advantageously represented by a Bayesian network. An introduction to the Bayesian network can be found in the article by T. A. Stephenson entitled "*An introduction to Bayesian network theory and usage*", IDIAP Research Report, February 2000.

It is reminded that a Bayesian network is an acyclic directed graph the nodes of which represent random (generally discrete) variables and the arcs of which represent the causal relations. An arc E between a start node (random variable) u and an arrival node (random variable) v is given a weight representing the conditional probability P(v|u). Thus, if the parents of a node v are a plurality of nodes $u_1, \ldots, u_N$, in other words if the random variable v is conditionally dependent on the random variables $u_1, \ldots, u_N$, there is:

$$P(v) = \prod_{k=1}^{N} P(v | u_k)$$

The weights of the arcs, that is the conditional probabilities between random variables are obtained by means of a learning phase.

In the absence of an a priori knowledge of the structure of the graph, the learning can be started with a high number of random variables and the graph can be simplified by removing arcs. For example, the arcs the weights of which are lower than a threshold value can be removed.

The Bayesian network (and more generally the probabilistic model) can be a function of the overflown region. It is understood indeed that the hazards can be different in a tropical region and in a temperate region. It can also depend on the aircraft type, since some aircrafts can be more susceptible to some weather conditions than others. It can even depend on the flight phase in which the aircraft is. Other parameters of the Bayesian network can be considered by those skilled in the art.

A typical example of weather hazard for an aircraft is to meet a cumulonimbus on its path. Indeed, this type of cloud can be in the heart of violent electrical events as thunderbolt but also hail storms, strong precipitations, frosting and strong wind shears. The main danger of cumulonimbus generally comes from downbursts (in particular in the approach phase) and severe turbulence that can occur in the high cloud layers. The presence of cumulonimbus can be detected by a ground forecast station by comparing satellite weather observations, relating to the upper atmosphere layers and ground weather observations. Alternatively, the presence of these cumulonimbus can be detected by the on-board system on the basis of these same observations, after they have been transmitted to the aircraft on the uplink.

Figure 5A:
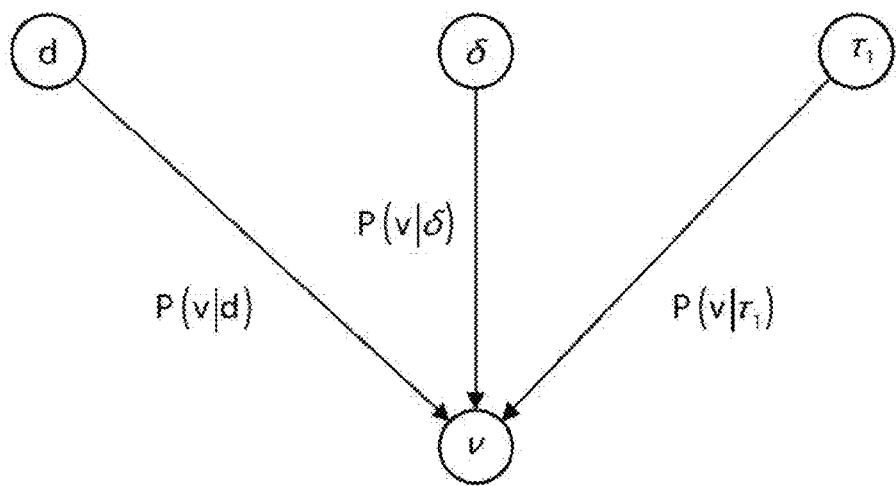
FIG. 5A represents a first example of Bayesian network for the expert system of FIG. 3.

FIG. 5A represents a first example of Bayesian network evaluating a weather hazard relating to the meeting of a cumulonimbus.

It is assumed that the current position $A_0$ of the aircraft and the forecast weather conditions for the time $t_1=t_0+d/V$ are known where $t_0$ refers to the current instant, d is the distance between the current position A of the aircraft and the point P of the region where it is desired to estimate the weather hazard, and V is the aircraft speed.

Figure 5B:
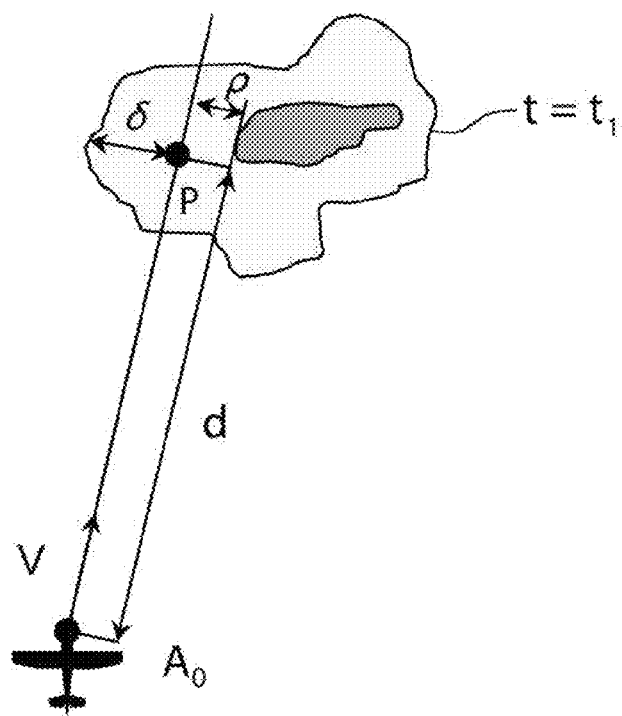
FIG. 5B represents a weather situation wherein the Bayesian network of FIG. 5A can operate.

In FIG. 5B is represented the situation relating to the aircraft and the cumulonimbus. The position and the extent of the cumulonimbus represented herein are those relating to the time $t_1$, that is for the instant when the aircraft reaches the point P.

The dark grey region located inside the cumulonimbus Cb is the one having a strong precipitation level. This region can be detected by means of radar reflectometry measurements (radar reflection coefficient higher than a predetermined threshold for example). The distance between the straight line (AP) and the boundary of the cumulonimbus is noted δ and the distance from the straight line (AP) to the region having a high precipitation level is ρ.

The Bayesian network of FIG. 5A involves herein the distances d and δ as well as the age of the forecast $\tau_1=t_1-t_\omega$ where $t_\omega$ is the instant at which the forecast has been performed. If need be, other random variables can be taken into account, such as the distance ρ defined above, the direction of movement of the cumulonimbus or its movement (provided by the weather forecast station). The confidence level η of the weather forecast (for example in the form of a standard deviation) as well as the severity of the hazard can also be parameters taken into consideration by the Bayesian network. In practice, the continuous random variables involved in the forecast, such as for example the distances d and δ are discretized (by integrating their probability density on the quantization steps) so as to always switch to discrete random variables.

As indicated above, the conditional probabilities relating to the different arcs of the graph are obtained during a learning phase.

When the database is complete, the learning phase can consist of comparing, by means of a weather database, forecast situations with real nowcast situations. On the other hand, if the database is not complete, the so-called EM (expectation-maximization) method can be used to obtain the conditional properties of the Bayesian network, in a known manner per se.

Figure 5C:
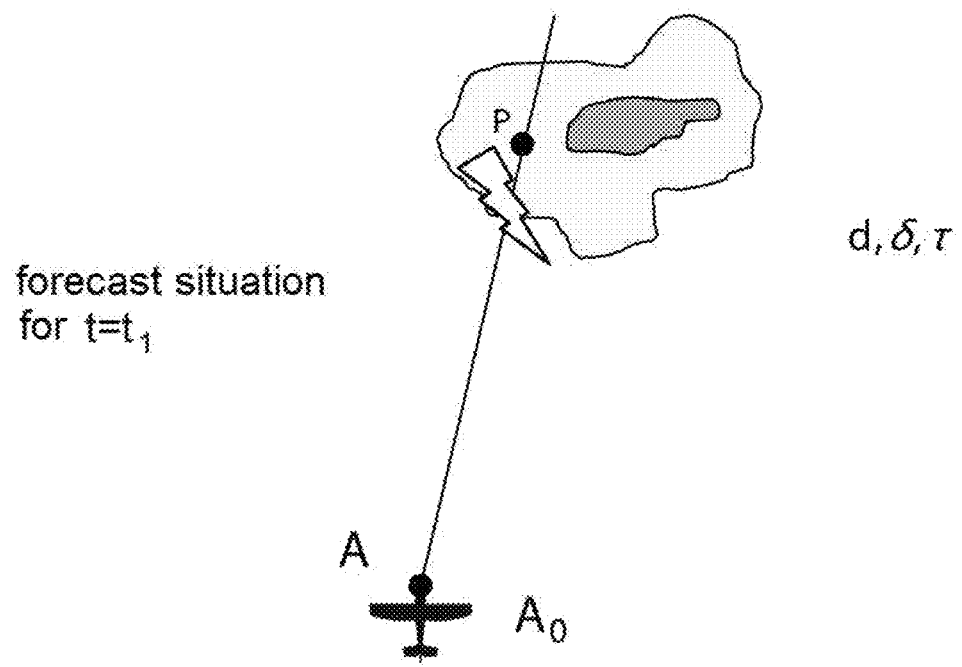
FIGS. 5C and 5D represent weather situations allowing the learning of the Bayesian network of FIG. 5A.

FIG. 5C illustrates a forecast situation at a point of interest P located at the distance d from an aircraft at the current position $A_0$. The forecast age is $\tau_1$ and the distance from the cumulonimbus boundary in the forecast situation at the time $t_1$ is δ.

Figure 5D:
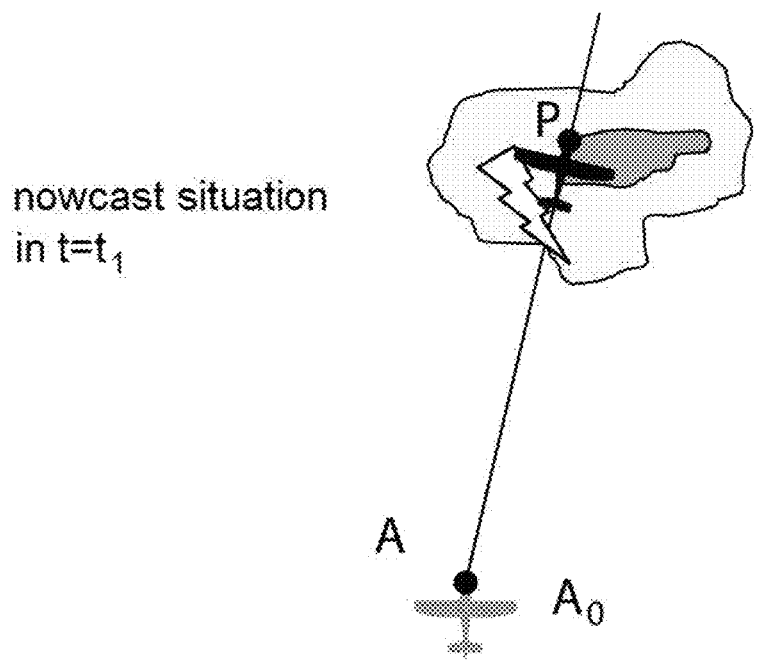

This forecast situation at the instant $t_\omega$ is compared with the real nowcast situation at the time $t_1$, represented in FIG. 5D. It can be seen in this case that the forecast was correct since the aircraft path actually passes through the cumulonimbus. For each correct forecast, a given score is ascribed, and for each erroneous forecast, a null score is ascribed. The conditional probabilities are obtained by making a mean of the scores obtained on a great number of forecast situations characterised by triplets $(d, \delta, \tau)$.

Figure 6A:
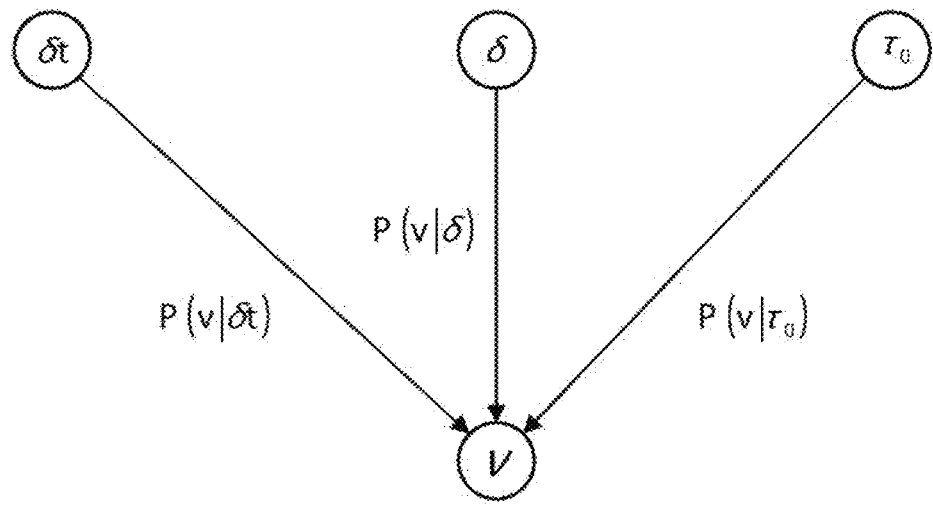
FIG. 6A represents a second example of Bayesian network for the expert system of FIG. 3.

FIG. 6A represents a second example of Bayesian network evaluating a weather hazard relating to the meeting of a cumulonimbus.

This Bayesian network is distinct from the preceding one in that the base of the probabilistic calculation is not the forecast weather situation for the instant $t_1$ when the aircraft arrives at the point P but the nowcast situation at the current instant $t_0$ (or the one which had been forecast for this instant).

Figure 6B:
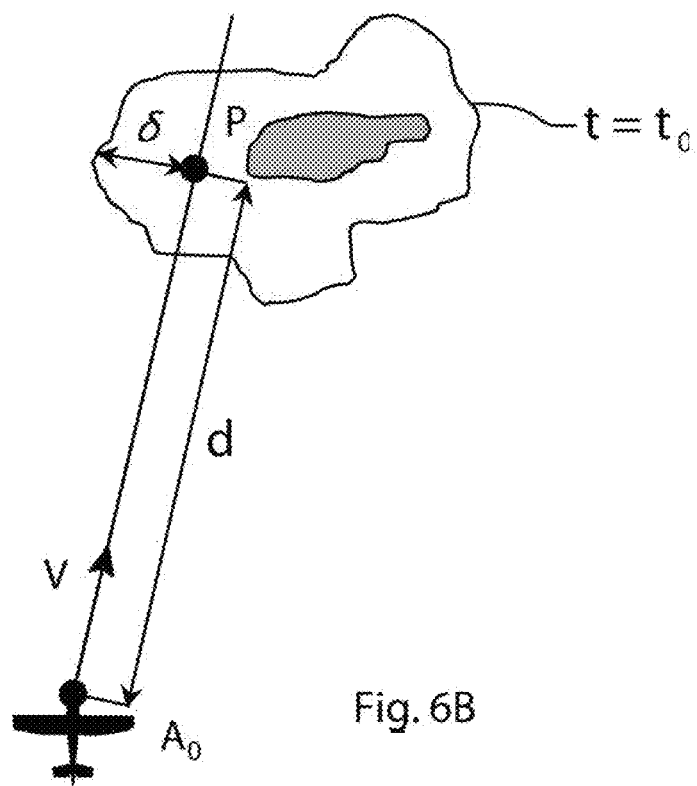
FIG. 6B represents a weather situation wherein the Bayesian network of FIG. 6A can operate.

FIG. 6B represents the relative situation of the aircraft and the cumulonimbus. It will be noticed that the position and extent of the cumulonimbus represented herein are those relative to the time $t_0$.

The random variables, that is the nodes of the graph of FIG. 6A, are here the time $\delta t = d/V$ required for the aircraft to travel the distance AP up to the point of interest, the distance $\delta$ from the straight line (AP) to the cumulonimbus boundary, the speed and direction of the cumulonimbus, the evolution type of the cumulonimbus (increasing, decreasing), the age of the forecast $\tau_0 = t_0 - t_\omega$. Once again, other random variables can be taken into consideration, as well as the confidence level $\eta$ of the forecast. The continuous random variables will be discretized in practice. For example, the distance $\delta$ can be discretized into the form (centre, peripheral, external) to translate the fact that the path intersects the cumulonimbus at its centre, at its periphery, or does not intersect it. In a similar way, the direction of the cumulonimbus could be discretized into eight values N, NE, E, SE, S, SW, W, NW.

The learning of the Bayesian network could be made as previously from the likelihood method when the database is complete or from the EM method when it is not.

Figure 7:
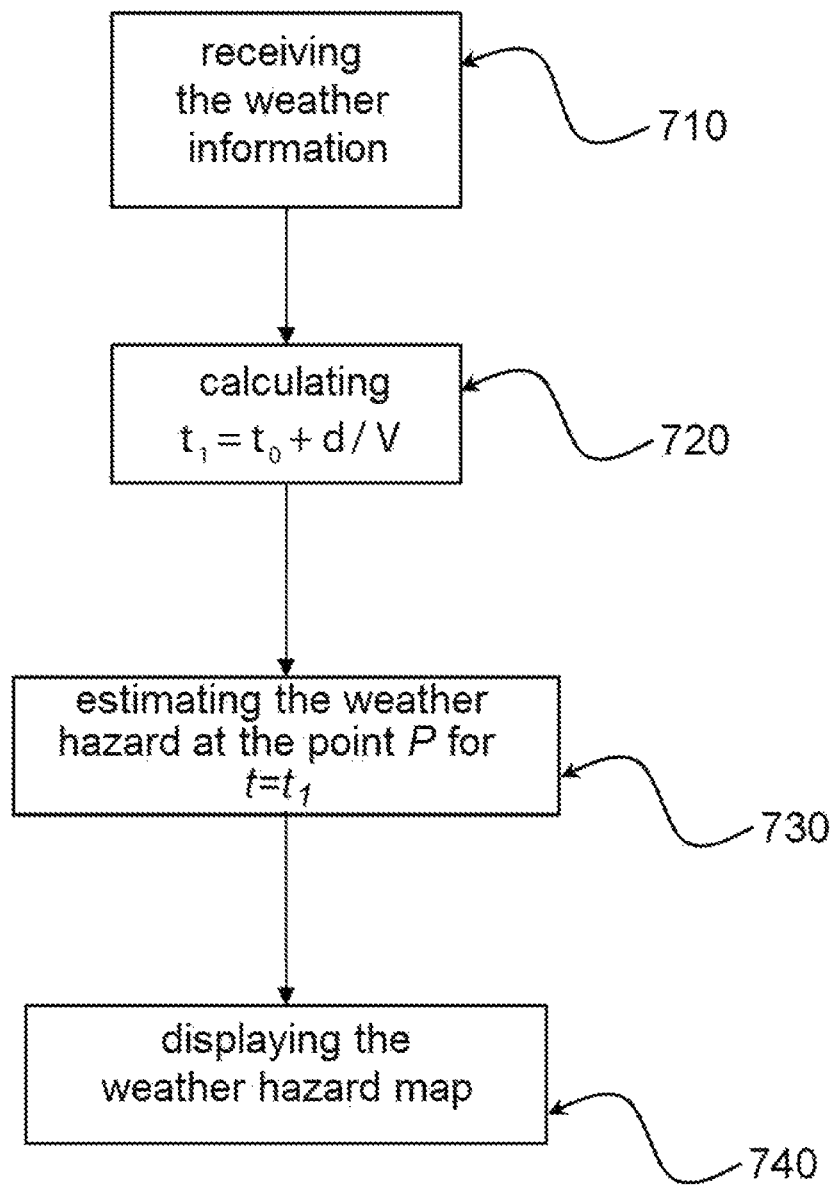
FIG. 7 represent as a flowchart a method for viewing weather hazards according to a first operating mode of the invention.

FIG. 7 represents as a flowchart a method for viewing weather hazards according to a first operating mode of the invention.

This method is implemented for viewing the weather hazards to which a vehicle is exposed in a predetermined region, typically in an angular sector the vertex of which is located at the vehicle position.

In a first step, 710, weather information is received for each point of said region. This weather information can be relating to a nowcast weather situation or a forecast weather situation for the point considered.

In a second step, 720, from the current position of the vehicle and for each point of the region considered, the time necessary for the vehicle to reach this point from its actual position, in other words the future instant at which it would reach this point, is determined, in view of its navigation parameters.

In a third step, 730, for each point of the region considered, from the weather information in this point and the corresponding future instant, the weather hazard to which the vehicle is exposed at this point and at the future instant, is estimated. The estimation is achieved by means of a probabilistic model, advantageously implemented by an expert system using a Bayesian network as previously described.

In a fourth step, 740, a mapping of the weather hazards is represented in the region considered. From this mapping, the vehicle pilot can then decide, with a high reliability degree, whether his/her foreseen flight route has a weather hazard and, if yes, search for an alternative flight route not having the hazard in question. This method is advantageous in that the hazard represented at each point of the region is not the current hazard but that to which the vehicle is exposed when it will reach this point. The mapping of the hazards is consequently directly interpretable for the pilot.

Figure 8:
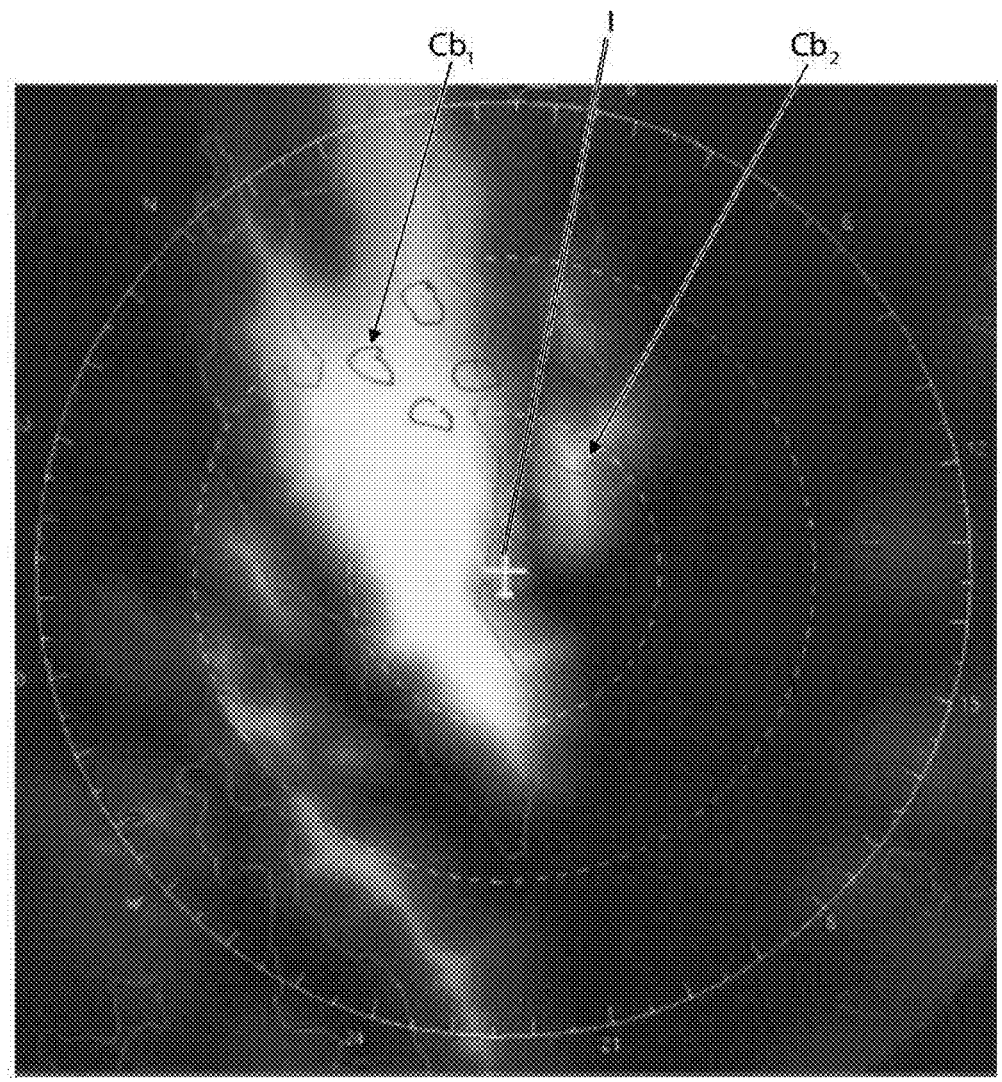
FIG. 8 represents an example of screen on which weather hazards according to the viewing method of FIG. 7 have been viewed.

FIG. 8 gives an example of a mapping for weather hazards obtained by the viewing method according to the invention.

The hazard represented here is to meet a stormy situation. The current position of the aircraft is located in the centre of the figure. The grey level of a pixel is proportional to the hazard level. It will be noticed that the flight route I can be validated despite the current stormy situation in $Cb_1$ and $Cb_2$, because the storms will have dispersed before the aircraft arrives thereat.

Figure 9:
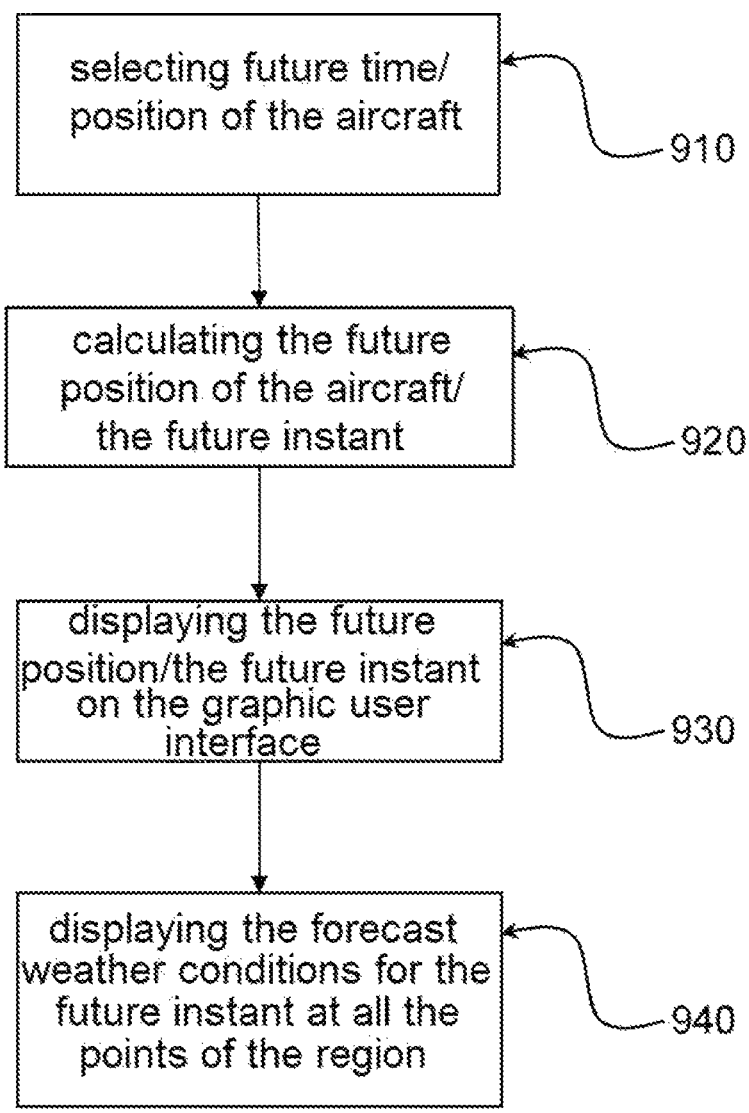
FIG. 9 represents as a flowchart a method for viewing weather hazards according to a second operating mode of the system of FIG. 3.

The system for viewing weather hazards according to the invention can further operate according to a second operating mode, complementary to the first one, as described hereinafter in connection with FIG. 9.

This second operating mode enables the pilot to view the weather conditions in a determined region, which are relating to an instant t that he/she can freely vary in an interval $[t_0 - T', t_0 + T]$, for example by moving a cursor on a time axis of the graphic interface. T'=0 can be chosen, since the representation of the past weather conditions has generally little interest for the pilot. By moving the cursor, the pilot selects an instant t of the interval in question. A forecast weather situation in the region for the time t is then displayed as well as, concomitantly, the ownship symbol in the new position of the aircraft foreseen for the time t. Conversely, when the flight route is displayed in the region, the pilot can move the aircraft along this flight route. The movement of the aircraft along the flight route correlatively causes a movement of the cursor on the time axis, an instant t on the time axis being one-to-one associated to the aircraft position on the flight route at this instant.

More precisely, in step 910, a time $t \in [t_0, t_0 + T]$ is selected or, conversely, a future position of the aircraft along its flight route is selected.

In step 920, the processor 310 calculates, from the current position $A(t_0)$ of the aircraft and its navigation parameters, the future position $A(t)$ of the aircraft at the selected time t. Conversely, if a future position A' is selected along the flight route of the aircraft, the processor 310 calculates from the positions $A(t_0)$, A' and navigation parameters, the time t required for the aircraft to reach the point A'.

In step 930, the processor displays the symbol of the aircraft at the position $A'=A(t)$ and the cursor at the position t on the time axis.

In step 940, the processor extracts from the mass storage the weather information relating to the time t for all the points of the region concerned and displays the weather conditions corresponding to this instant.

An automatic scanning mode can also be provided. According to this mode, the instant t is scanned in a loop manner between the bounds $t_0$ and $t_0 + T$, and steps 910 to 940 are iterated.

Figure 10A:
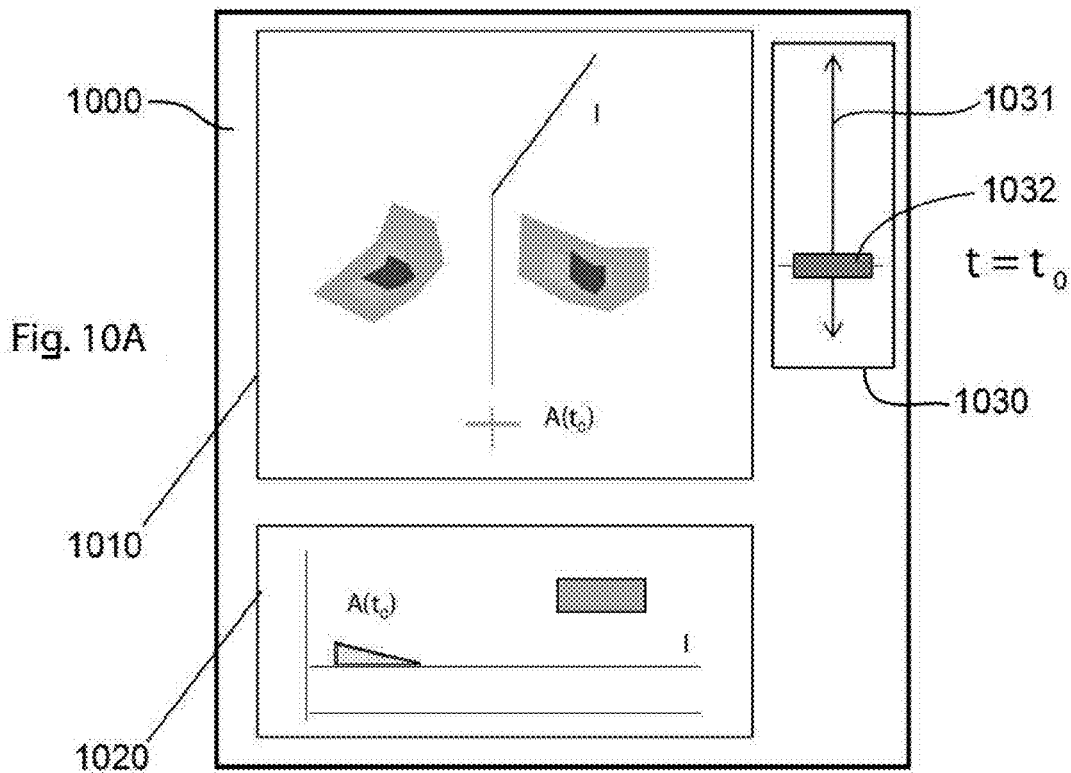
FIGS. 10A and 10B represent a window of the graphic interface displaying weather conditions of a given region at a current instant and at a future instant, by means of the method of FIG. 9

FIG. 10A represents a window 1000 of the graphic user interface displaying the current weather conditions in a region ahead of the aircraft. More precisely, the window comprises a first part 1010 wherein these weather conditions are displayed along a horizontal cross-section containing the aircraft and a second part 1020 displaying these weather conditions along a vertical cross-section along the foreseen flight route. The current position of the aircraft is referred to as $A(t_0)$ and the flight route is referred to as I. The window 1000 further comprises a third part 1030 wherein a time axis 1031, advantageously graduated in time, along which a cursor 1032 can be moved (for example in a tactile way or using a mouse) is displayed. The time axis is here vertical but it will be understood that it could be provided horizontally. Alternatively, the pilot can move, by the same means as previously (touch screen or mouse), the aircraft along its path, whether in the horizontal cross-section 1010 or in the vertical cross-section 1020. The movement of the cursor 1032 along the time axis 1031 causes the movement of the aircraft along the flight route I and conversely. It is noticed in the figure that, at the nowcast of forecast situation at time $t_0$, the flight route I does not intersect a stormy development.

Figure 10B:
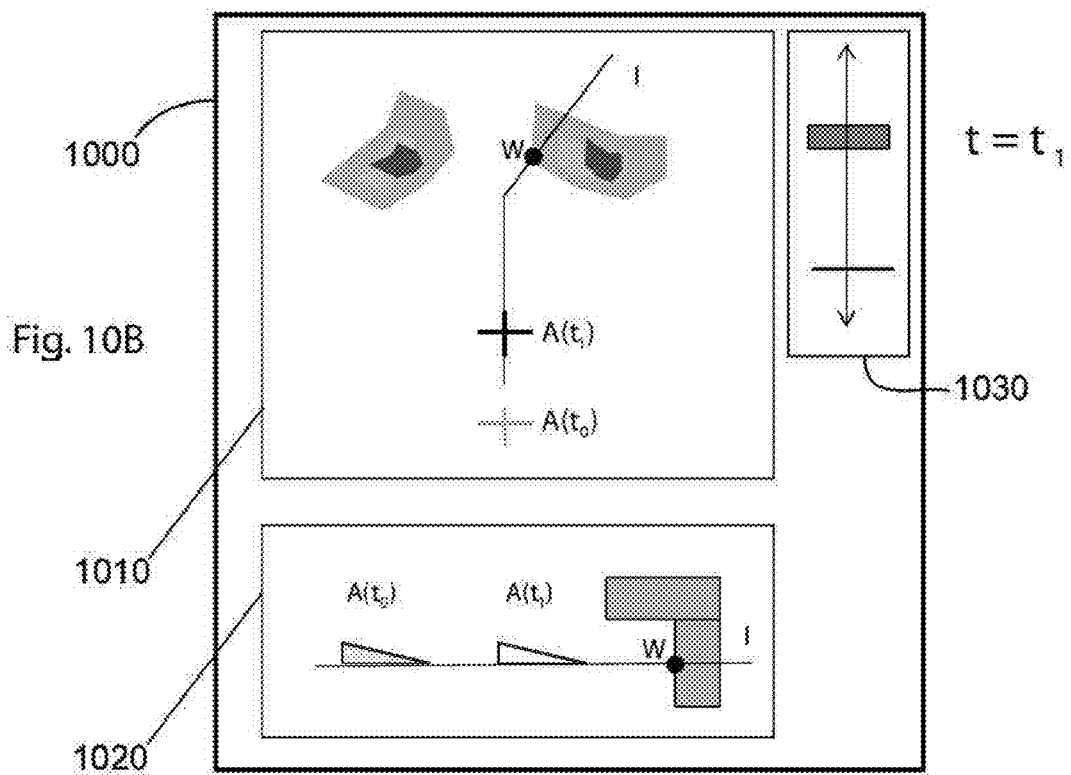

FIG. 10B represents the same window 1000 at an instant $t_1$ 30 min after the instant $t_0$. It is noticed that the position of the cursor and that of the aircraft have varied accordingly. $A(t_0)$ refers herein to the position of the aircraft at the instant $t_0$ and $A(t_1)$ to the position of the aircraft at the instant $t_1$. Thus, by moving the aircraft, or equivalently, by moving the cursor on the time axis, whether weather hazards are present or not along the flight route can be checked. In the present case, it is noticed that according to the forecast situation for the time $t_1$, the flight route intersects a stormy situation in W. However, to make sure of the relevancy of the hazard in W, the pilot can continue the movement of the aircraft symbol up to this point.

This second operating mode can advantageously complete the first one. Indeed, using the first mode, the pilot can quickly make a decision about an alternative flight route to avoid a weather hazard, this avoidance can be horizontal and/or vertical. He/she can then move the symbol of the aircraft along the flight route in question, according to the second mode, to make sure that the aircraft is not confronted with a significant weather hazard in any point of its path.

The invention claimed is:

1. A system for viewing weather hazards in a predetermined region, said system being intended to be on-board an aircraft and comprising:
   communication means for receiving weather information at each point of said region;
   a processor for determining, for each point of said region, from a current position of the aircraft and navigation parameters of the aircraft, a future instant at which the aircraft would reach said each point;
   an expert system using a Bayesian network representing a probabilistic model for estimating, at each point of said region, from said weather information, a weather hazard at said each point at said future instant; and
   a graphic interface for representing, at each point of said region, the weather hazards estimated by the expert system, wherein:
   the weather hazard is the presence of a weather event bounded by a boundary, and
   the Bayesian network estimates the weather hazard at a point of said region at the future instant at which the aircraft would reach the point from at least the weather information in said region for the future instant, a distance separating the current position of the aircraft and the point, a distance to the boundary of the weather event along a path perpendicular to a straight line through the current position and the point, and the age of said forecast weather information.

2. The viewing system according to claim 1, wherein the predetermined region is a corridor around a previously determined flight route of the aircraft.

3. The viewing system according to claim 1, wherein the predetermined region is an angular sector the vertex of which is located at the current position of the aircraft.

4. The viewing system according to claim 1, wherein the weather information relates to a nowcast situation at a current instant and/or to forecast situations for a plurality of future instants, said weather information being stored in a database.

5. The viewing system according to claim 1, wherein the Bayesian network also estimates the weather hazard based on the confidence level of the weather information when it is forecast.

6. The viewing system according to claim 5, further comprising means for selecting an instant in a predetermined time range, wherein, in a second operating mode, the processor is adapted to calculate a position of the aircraft corresponding to a selected instant in this range and, conversely, to calculate a time for a selected position of the aircraft, the processor being further adapted to display on the graphic interface the calculated or selected position of the aircraft as well as the weather conditions at the selected or calculated time.

7. A method for viewing weather hazards to which an aircraft is likely to be exposed, within a predetermined region, said method comprising:
   receiving weather information at each point of said region;
   calculating, for each point of said region, from a current position of the aircraft and navigation parameters of the aircraft, a future instant at which the aircraft would reach said each point;
   estimating using an expert system utilizing a Bayesian network representing a probabilistic model for estimating, at each point of the said region, from said weather information, a weather hazard at said each point at said future instant; and
   displaying, at each point of the considered region, the weather hazard thus estimated at the preceding step, wherein:
   the weather hazard is the presence of a weather event bounded by a boundary, and
   the Bayesian network estimates the weather hazard at a point of said region at the future instant at which the aircraft would reach the point from at least the weather information in said region for the future instant, a distance separating the current position of the aircraft and the point, a distance to the boundary of the weather event along a path perpendicular to a straight line through the current position and the point, and the age of said forecast weather information.

8. The viewing method according to claim 7, wherein the predetermined region is a corridor around a previously determined flight route of the aircraft.

9. The viewing method according to claim 7, wherein the predetermined region is an angular sector the vertex of which is located at the current position of the aircraft.

10. The viewing method according to claim 7, wherein the weather information relates to a nowcast situation at a current instant and/or to forecast situations for a plurality of future instants.

* * * * *